June 24, 1958 W. LEE 2,839,791
DOOR
Filed April 24, 1957
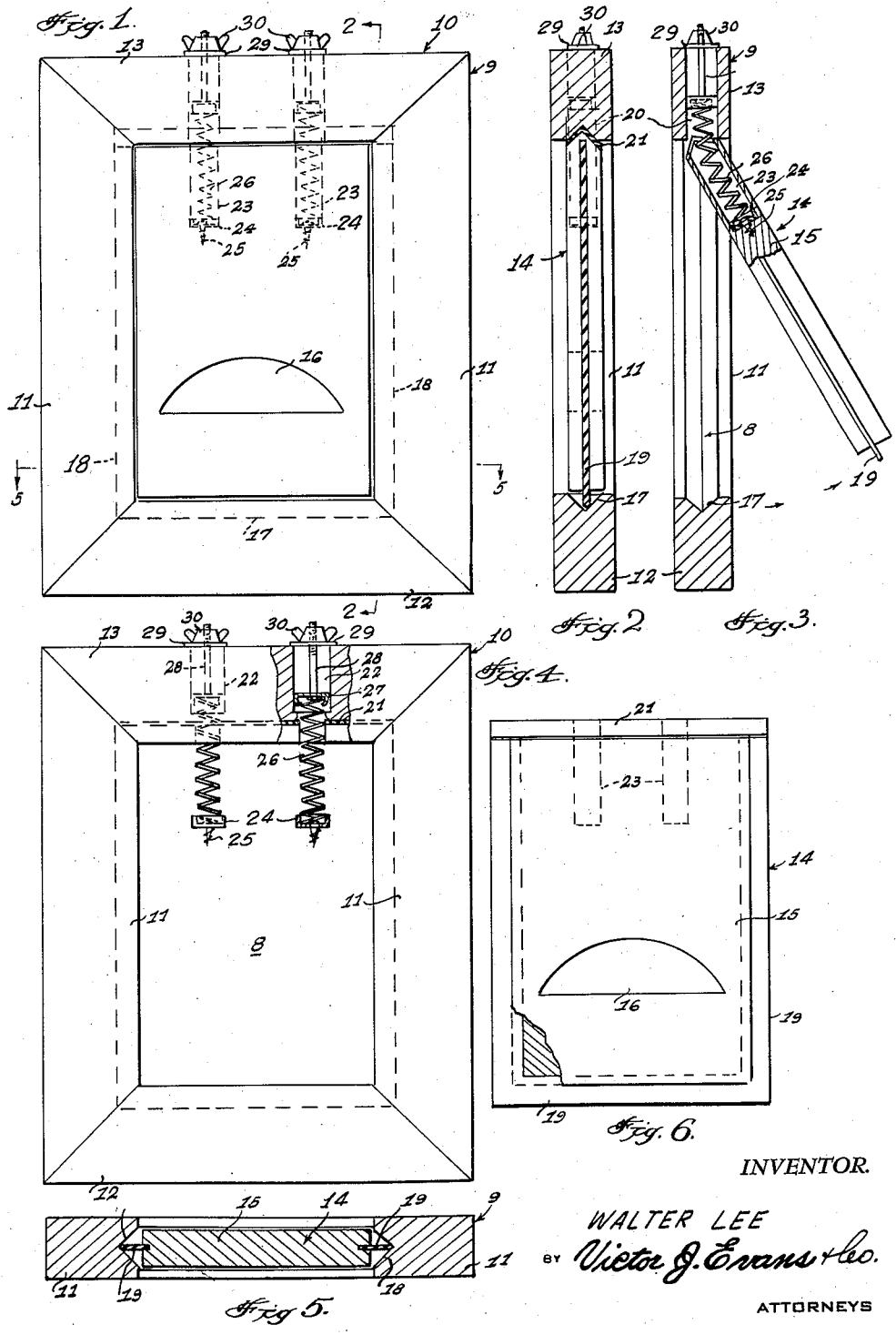
INVENTOR.
WALTER LEE
BY *Victor J. Evans & Co.*
ATTORNEYS

United States Patent Office 2,839,791
Patented June 24, 1958

2,839,791

DOOR

Walter Lee, San Francisco, Calif.

Application April 24, 1957, Serial No. 654,848

1 Claim. (Cl. 20—16)

This invention relates to a door, and more particularly to a door for use by animals such as dogs.

The object of the invention is to provide a closure member which includes a stationary frame and a movable door whereby an animal such as a dog can readily pass therethrough without requiring the owner's attention.

Another object of the invention is to provide an animal closure which includes a hingedly mounted door that can be readily opened by the animal passing therethrough, and whereby the door automatically closes after the animal has moved therethrough, the closure being constructed so that wind or other adverse weather conditions will not accidentally travel past the closure.

A further object of the invention is to provide an animal door which is extremely simple and inexpensive to manufacture.

Other objects and advantages will be apparent during the course of the following description.

In the accompanying drawings, forming a part of this application, and in which like numerals are used to designate like parts throughout the same.

Figure 1 is an elevational view of the closure constructed according to the present invention.

Figure 2 is a sectional view taken on the line 2—2 of Figure 1.

Figure 3 is a view similar to Figure 2 but showing the door open.

Figure 4 is an elevational view, with parts broken away and in section, showing the stationary frame.

Figure 5 is a sectional view taken on the line 5—5 of Figure 1.

Figure 6 is an elevational view of the door, with parts broken away and in section.

Referring in detail to the drawings, the numeral 10 indicates an animal closure which permits an animal to pass therethrough without requiring the owner's attention, and the closure 10 includes the frame 9 which embodies a pair of spaced parallel vertically disposed side members 11, and horizontally disposed spaced parallel bottom and top members 12 and 13. These members of the frame 9 coact to define therebetween a rectangular opening 8 whereby the animal can pass therethrough.

The closure 10 further includes a movable door 14 which is mounted for movement into and out of closing relation with respect to the opening 8, and the closure 14 includes a main portion 15 which has a transparent panel 16 mounted therein whereby the animal can readily see therethrough.

The bottom member 12 is provided with a V-shaped notch 17, Figure 2, and the side members 11 are provided with V-shaped notches 18. A strip of yieldable material such as rubber 19 extends outwardly from the sides of the door 14 and from the bottom of the door 14, and these strips 19 project into the notches 17 and 18 whereby when the door is in closed position, wind or other adverse weather conditions will not adversely effect occupants inside the building.

The top member 13 is also provided with a V-shaped notch 20, Figures 2 and 3, and a strip or rubber 21 may be secured to the upper end of the door 14 so as to provide a further means for preventing wind or the like from passing beyond the door. The upper end of the door 14 is V-shaped in cross section.

The top member 13 of the frame 9 is further provided with a pair of spaced apart openings 22 which are adapted to register with similar openings 23 in the door 14. Support members 24 are positioned in the openings 23, and the support members 24 are secured to the door 14 through the medium of suitable securing elements such as the screws 25. Coil springs 26 extend upwardly from the support members 24, and the coil springs 26 have their upper ends connected to brackets 27 which are positioned in the openings 22 in the door frame 9. Suitable supporting elements such as bolts 28 extend upwardly from the brackets 27 and are secured thereto, there being washers 29 circumposed on the bolts 28, the washers 29 being positioned beneath wing nuts 30.

From the foregoing, it is apparent that there has been provided a closure which is especially suitable for use with animals such as dogs. In use, it will be seen that the closure 10 includes the stationary rectangular frame 19 which has the central opening 8 therein, and this opening 8 is defined by the members 11, 12 and 13. The door 14 is hingedly mounted so that the door 14 can move into and out of closing relation with respect to the opening 8. The door 14 is adapted to be opened when the animal such a dog presses thereagainst whereby the dog can readily pass through the closure and the closure can be arranged in any suitable location. Thus, a dog or other animal can pass through the opening 8 without requiring the attention of the owner. The door will swing in either direction, and due to the provision of the springs 26, it will be seen that when the dog or other animal passes beyond the door, the springs 26 will return the door 14 to its closed position from the position shown in Figure 3 to the position shown in Figure 2.

As previously stated, the door is provided with rubber strips such as the strips 19 which project into the notches 18 and 17 so that wind or the like will not accidentally pass through the opening 8 when the door is in closed position. By means of the wing nuts 30, the tension of the coil springs 26 can be varied as desired. The coil springs 26 thus function as hinges and also serve as a means for automatically returning the door to closed position after the dog passes therethrough. The transparent panel 16 permits the animal to readily see through the door which makes the device mor attractive or capable of use by the animal or dog.

The adjustable wing nuts 30 serve to control and equalize the tension of a pair of springs 26 so as to insure that the door 14 will close with the proper amount of force for large or small animals. These springs also serve as hinges. The door will swing in either direction. The glass panel 16 will encourage the dog to use the door since the dog can see where he or she is going. The rubber strips such as the strips 19 on the door as well as the V-shaped upper portion of the door serves to make the door and door frame wind-proof.

The above description of the invention is for illustrative purposes only and it is understood that modifications may be made in the construction within the scope and spirit of the following claim.

I claim:

In an animal closure, a stationary rectangular frame including spaced parallel vertically disposed side members, spaced parallel horizontally disposed top and bottom members, the inner portions of said members being provided with V-shaped notches, said members cooperating to define therebetween a rectangular opening, a door mounted for movement into and out of closing relation with respect to said opening, a transparent panel mounted in said door, a strip of yieldable material extending outwardly from the sides and bottom of said door and projecting into said V-shaped notches, the upper end of said door being V-shaped in cross section and a strip of yieldable material secured to the upper end of the door and adapted to project into the V-notch at the top of the door, there being registering openings in the top member of said frame and in said door, a support member positioned in each opening in said door and secured to said door, coil springs connected to said support members, brackets positioned in the openings in the top member of said frame and connected to the upper end of the coil springs, and securing elements extending upwardly from said brackets and connected thereto.

References Cited in the file of this patent
UNITED STATES PATENTS

| | | |
|---|---|---|
| 76,793 | Mills | Apr. 14, 1868 |
| 1,658,386 | Mayers | Feb. 7, 1928 |
| 1,688,930 | Hyland | Oct. 23, 1928 |
| 1,979,490 | Robertson | Nov. 6, 1934 |
| 2,498,411 | Geib | Feb. 21, 1950 |